(12) United States Patent
Yang (10) Patent No.: US 12,302,464 B1
(45) Date of Patent: May 13, 2025

(54) LIGHT EMITTING DIODE CONTROL CIRCUITRY

(71) Applicant: Meta Platforms Technologies, LLC, Menlo Park, CA (US)

(72) Inventor: Dong Yang, Milpitas, CA (US)

( * ) Notice: Subject to any disclaimer, the term of this patent is extended or adjusted under 35 U.S.C. 154(b) by 33 days.

(21) Appl. No.: 18/068,991

(22) Filed: Dec. 20, 2022

Related U.S. Application Data (60) Provisional application No. 63/380,416, filed on Oct. 21, 2022.

(51) Int. Cl.
*H05B 45/34* (2020.01)
*G02B 27/01* (2006.01)

(52) U.S. Cl.
CPC ......... *H05B 45/34* (2020.01); *G02B 27/0172* (2013.01)

(58) Field of Classification Search
CPC ............................. H05B 45/34; G02B 27/0172
See application file for complete search history.

(56) References Cited

U.S. PATENT DOCUMENTS

| | | | | |
|---|---|---|---|---|
| 8,169,161 B2 * | 5/2012 | Szczeszynski | ....... | H05B 45/347 |
| | | | | 315/308 |
| 9,210,748 B2 * | 12/2015 | Evans | ..................... | H05B 45/38 |
| 10,804,865 B1 * | 10/2020 | Lin | .......................... | H03F 3/303 |
| 2021/0201769 A1 * | 7/2021 | Morris | ................. | G09G 3/2088 |

FOREIGN PATENT DOCUMENTS

| | | | | |
|---|---|---|---|---|
| EP | 2687842 A1 * | 1/2014 | ......... | G01N 27/4065 |
| WO | WO-2004057921 A1 * | 7/2004 | ......... | H05B 33/0815 |

* cited by examiner

*Primary Examiner* — Lincoln D Donovan
*Assistant Examiner* — James G Yeaman
(74) *Attorney, Agent, or Firm* — Potomac Law Group, PLLC; Dannon G. Allbee (57) ABSTRACT

Aspects of the present disclosure are directed to systems and methods for controlling light emitting diodes (LEDs) in an electronic device, such as an artificial reality (XR) head-mounted display (HMD) or other XR device in an XR system. In an XR HMD, the LEDs can be positioned proximate to and/or facing the eyes and/or face of a user to illuminate such features for movement tracking and other purposes. Implementations can provide LED control circuitry that can continuously monitor the output current provided to the LEDs. If the integral of the output current over time exceeds a threshold current, implementations can latch the current to the LEDs.

20 Claims, 11 Drawing Sheets

LIGHT EMITTING DIODE CONTROL CIRCUITRY

CROSS REFERENCE TO RELATED APPLICATIONS

This application claims priority to U.S. Provisional Patent Application No. 63/380,416, titled "Light Emitting Diode Control Circuitry," which is herein incorporated by reference in its entirety.

TECHNICAL FIELD

The present disclosure is directed to light-emitting diode (LED) control circuitry.

BACKGROUND

Artificial reality (XR) devices are becoming more prevalent. As they become more popular, the applications implemented on such devices are becoming more sophisticated. XR experiences can be observed by a user through a head-mounted display (HMD), such as glasses or a headset. The HMD can have a number of electronic components needed to provide a fully immersive XR experience, such as a display, speakers, cameras, microphones, processing components, etc. More sophisticated HMDs can further include light-emitting diodes (LEDs) positioned toward the user to illuminate the user's eyes and/or face, in order to track movements and gestures thereof.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Aspects of the present disclosure are directed to systems and methods for controlling light emitting diodes (LEDs) in an electronic device, such as an artificial reality (XR) head-mounted display (HMD). In an XR HMD, the LEDs can be positioned proximate to and/or facing the eyes and/or face of a user to illuminate such features for movement tracking and other purposes. Implementations can provide LED control circuitry that can continuously monitor the output current provided to the LEDs. If the integral of the output current over time exceeds a threshold current, implementations can latch the current to the LEDs.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Figure 1A:
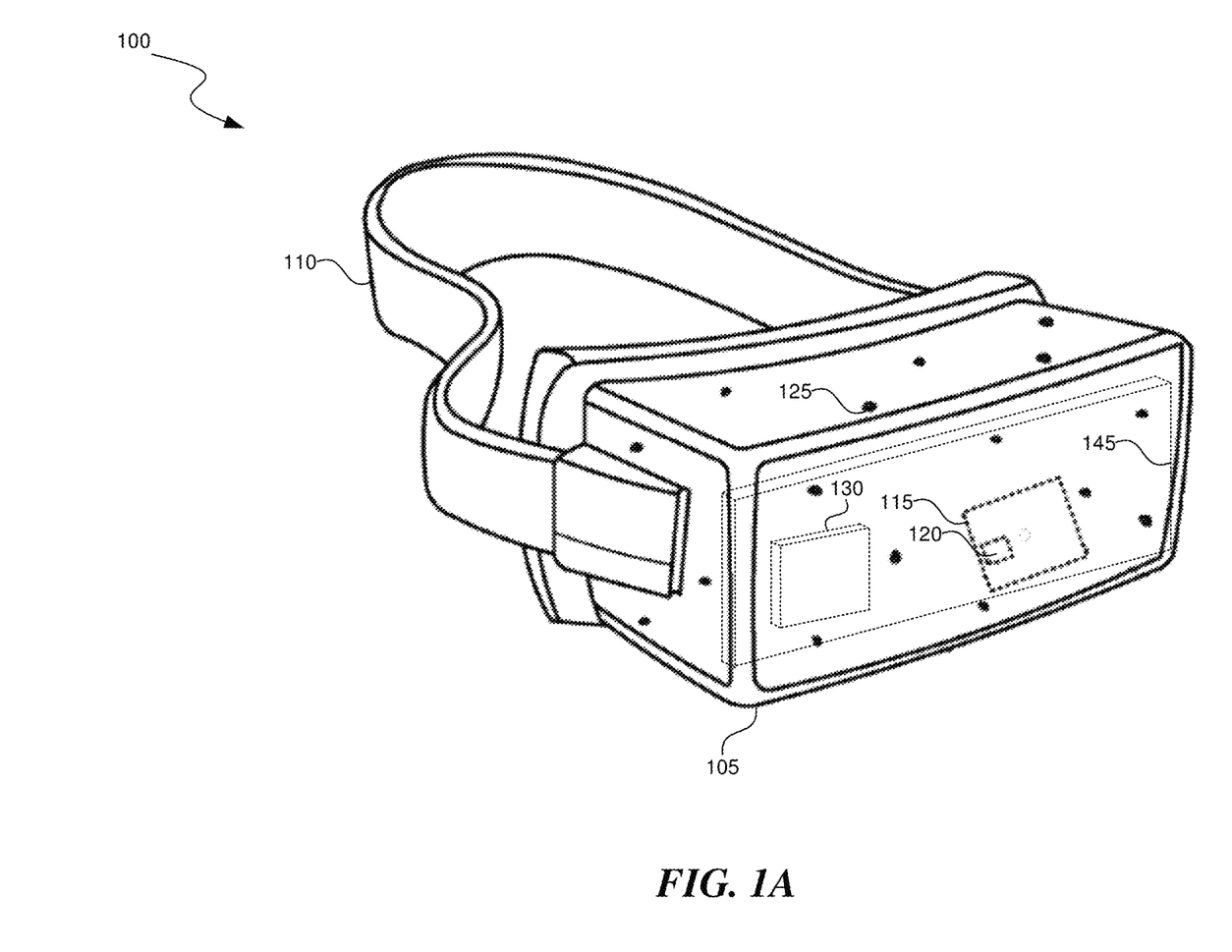
FIG. 1A is a wire diagram illustrating a virtual reality headset which can be used in some implementations of the present technology.

FIG. 1A is a wire diagram of a virtual reality head-mounted display (HMD) 100, in accordance with some embodiments. The HMD 100 includes a front rigid body 105 and a band 110. The front rigid body 105 includes one or more electronic display elements of an electronic display 145, an inertial motion unit (IMU) 115, one or more position sensors 120, locators 125, and one or more compute units 130. The position sensors 120, the IMU 115, and compute units 130 may be internal to the HMD 100 and may not be visible to the user. In various implementations, the IMU 115, position sensors 120, and locators 125 can track movement and location of the HMD 100 in the real world and in an artificial reality environment in three degrees of freedom (3DoF) or six degrees of freedom (6DoF). For example, the locators 125 can emit infrared light beams which create light points on real objects around the HMD 100. As another example, the IMU 115 can include e.g., one or more accelerometers, gyroscopes, magnetometers, other non-camera-based position, force, or orientation sensors, or combinations thereof. One or more cameras (not shown) integrated with the HMD 100 can detect the light points. Compute units 130 in the HMD 100 can use the detected light points to extrapolate position and movement of the HMD 100 as well as to identify the shape and position of the real objects surrounding the HMD 100.

The electronic display 145 can be integrated with the front rigid body 105 and can provide image light to a user as dictated by the compute units 130. In various embodiments, the electronic display 145 can be a single electronic display or multiple electronic displays (e.g., a display for each user eye). Examples of the electronic display 145 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 100 can be coupled to a core processing component such as a personal computer (PC) (not shown) and/or one or more external sensors (not shown). The external sensors can monitor the HMD 100 (e.g., via light emitted from the HMD 100) which the PC can use, in combination with output from the IMU 115 and position sensors 120, to determine the location and movement of the HMD 100.

Figure 1B:
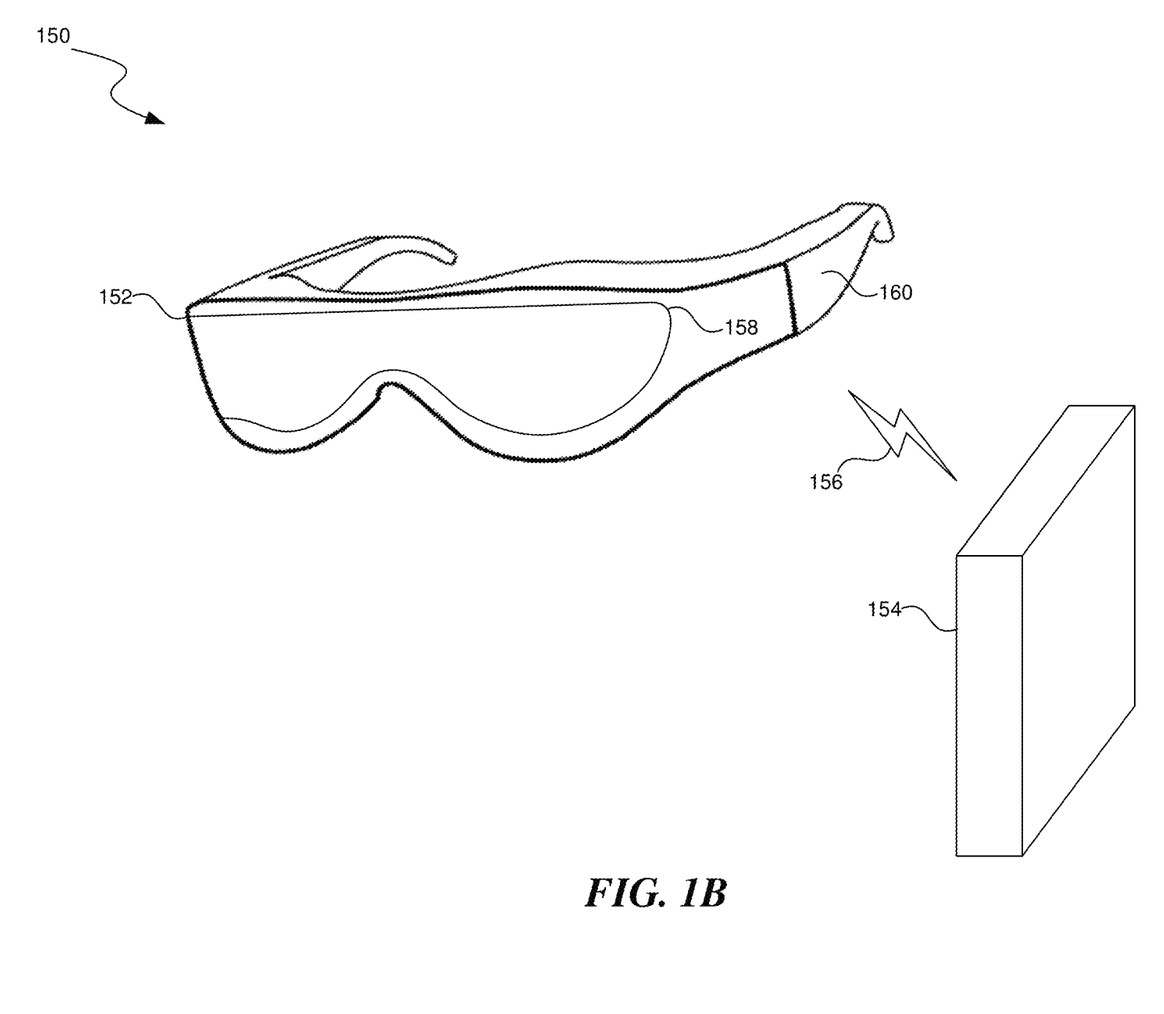
FIG. 1B is a wire diagram illustrating a mixed reality headset which can be used in some implementations of the present technology.

FIG. 1B is a wire diagram of a mixed reality HMD system 150 which includes a mixed reality HMD 152 and a core processing component 154. The mixed reality HMD 152 and the core processing component 154 can communicate via a wireless connection (e.g., a 60 GHz link) as indicated by link 156. In other implementations, the mixed reality system 150 includes a headset only, without an external compute device or includes other wired or wireless connections between the mixed reality HMD 152 and the core processing component 154. The mixed reality HMD 152 includes a pass-through display 158 and a frame 160. The frame 160 can house various electronic components (not shown) such as light projectors (e.g., LASERs, LEDs, etc.), cameras, eye-tracking sensors, MEMS components, networking components, etc.

The projectors can be coupled to the pass-through display 158, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 154 via link 156 to HMD 152. Controllers in the HMD 152 can convert the image data into light pulses from the projectors, which can be transmitted via the optical elements as output light to the user's eye. The output light can mix with light that passes through the display 158, allowing the output light to present virtual objects that appear as if they exist in the real world.

Similarly to the HMD 100, the HMD system 150 can also include motion and position tracking units, cameras, light sources, etc., which allow the HMD system 150 to, e.g., track itself in 3DoF or 6DoF, track portions of the user (e.g., hands, feet, head, or other body parts), map virtual objects to appear as stationary as the HMD 152 moves, and have virtual objects react to gestures and other real-world objects.

In various implementations, the HMD 100 or 150 can also include additional subsystems, such as an eye tracking unit, an audio system, various network components, etc., to monitor indications of user interactions and intentions. For example, in some implementations, instead of or in addition to controllers, one or more cameras included in the HMD 100 or 150, or from external cameras, can monitor the positions and poses of the user's hands to determine gestures and other hand and body motions. As another example, one or more light sources can illuminate either or both of the user's eyes and the HMD 100 or 150 can use eye-facing cameras to capture a reflection of this light to determine eye position (e.g., based on set of reflections around the user's cornea), modeling the user's eye and determining a gaze direction.

Those skilled in the art will appreciate that the components illustrated in FIGS. 1A-B described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 2:
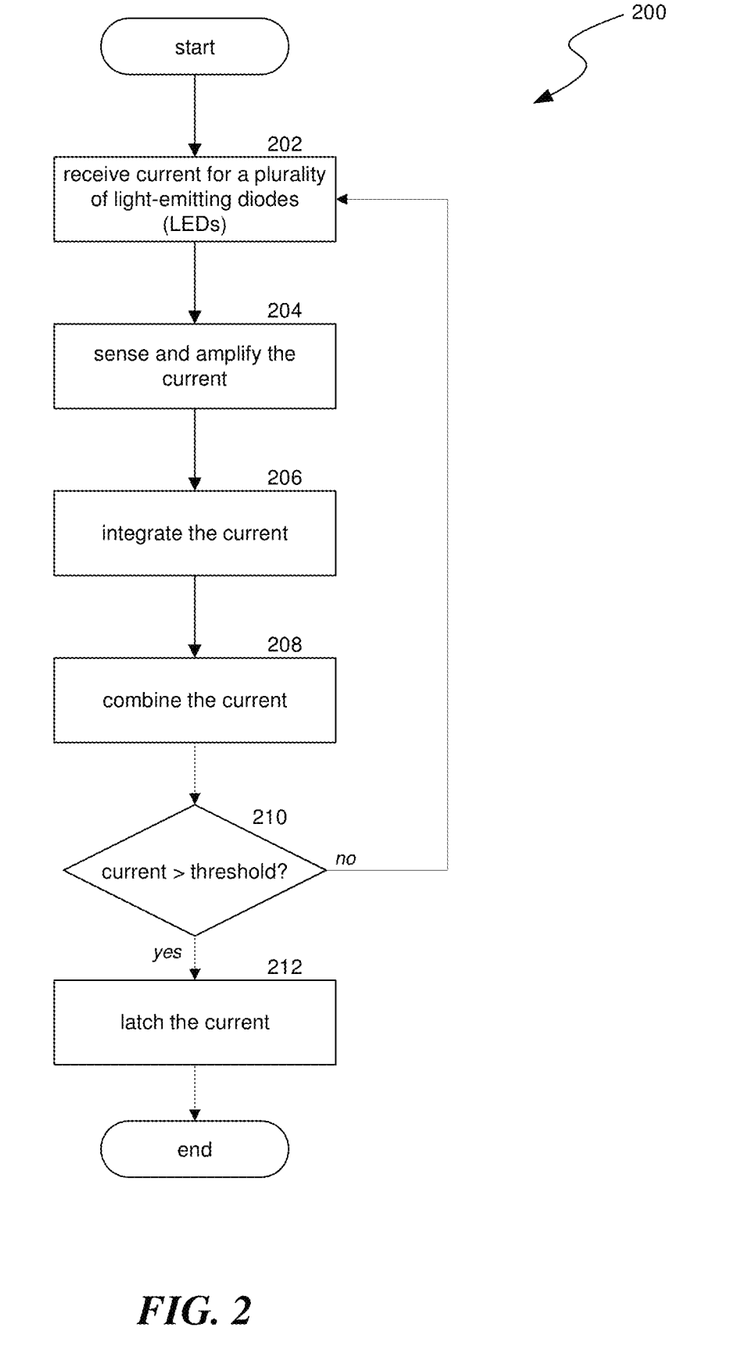
FIG. 2 is a flow diagram illustrating a process used in some implementations of the present technology for controlling a plurality of light-emitting diodes (LEDs).

FIG. 2 is a flow diagram illustrating a process 200 used in some implementations for controlling a plurality of light-emitting diodes (LEDs). In some implementations, process 200 can be performed as current is received for a plurality of light-emitting diodes (LEDs) in an electronic device. In some implementations, process 200 can be performed upon activation of an electronic device including a plurality of LEDs. In some implementations, the electronic device can be an artificial reality (XR) head-mounted display (HMD) or other XR device in an XR system. The XR HMD can have a rigid body configured to be worn on a face of a user. In some implementations, the XR HMD can have the plurality of LEDs proximate to and/or facing the eyes of the user, the face of the user, or both, e.g., for eye and/or face tracking purposes. In some implementations, process 200 can be performed by a system for controlling a plurality of LEDs, such as system 300A described further herein.

At block 202, process 200 can receive, by LED control circuitry, current for a plurality of LEDs. In some implementations, the current can be generated by LED driver circuitry and provided to the LED control circuitry. The LED driver circuitry can be any suitable circuitry designed to provide current to the plurality of LEDs to drive the LEDs to illumination.

At block 204, process 200 can sense and amplify, by a plurality of current sense amplifiers, the current received by the LED control circuitry. The plurality of current sense amplifiers can be, for example, current sense amplifier circuitry 302A-E of FIG. 3A as described further herein. In some implementations, each current sense amplifier can receive a reference voltage, and can be configured to bias its output around the reference voltage. In some implementations, the reference voltage can be generated by a buffered resistor divider.

At block 206, process 200 can integrate, by a plurality of integrators, the current sensed and amplified by the plurality of current sense amplifiers. The plurality of integrators can be included in, for example, integrator circuitry 304A-C of FIG. 3A as described further herein. In some implementations, process 200 can integrate the current minus a fixed direct current (DC) offset. At block 208, process 200 can combine, by a combiner, the current integrated by the plurality of integrators. In some implementations, the combiner can be an AND gate.

At block 210, process 200 can determine whether an integral of the current over time exceeds a threshold. If the integral does not exceed the threshold, process 200 can return to block 202. If the integral exceeds the threshold, process 200 can proceed to block 212. At block 212, process 200 can latch, by a comparator, the current to the plurality of LEDs when the integral exceeds the threshold. The comparator can be included in, for example, comparator circuitry 306 of FIG. 3A. In some implementations, the threshold can be a maximum steady state current associated with producing a maximum desired irradiance of the plurality of LEDs, e.g., 100 W/m². In some implementations, the comparator can be configured to latch the current to the plurality of LEDs when the integral exceeds the threshold until a reset is issued.

Figure 3A:
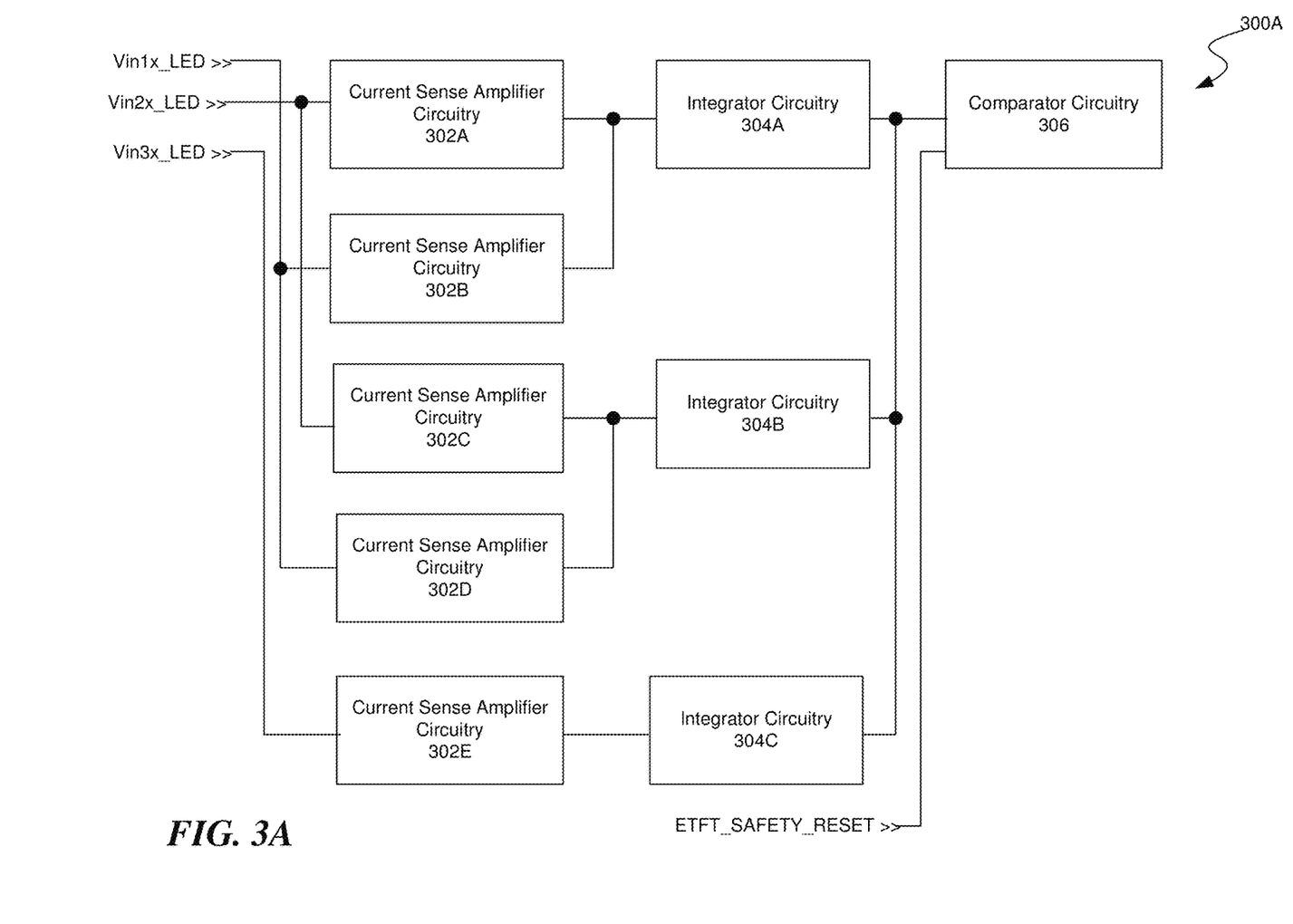
FIG. 3A is a schematic diagram illustrating a system for controlling a plurality of light-emitting diodes (LEDs).

FIG. 3A is a schematic diagram illustrating a system 300A for controlling a plurality of light-emitting diodes (LEDs). System 300A can include current sense circuitry 302A-E in series with integrator circuitry 304A-C and comparator circuitry 306. Current sense amplifier circuitry 302A-E can sense and amplify high-side current being provided to a plurality of LEDs. Integrator circuitry 304A-C can integrate the sensed current. In some implementations, integrator circuitry 304A-C can integrate the sensed current minus a fixed direct current (DC) offset. Comparator circuitry 306 can compare the resulting value against a threshold (e.g., can detect a fault condition), and latch the current if the threshold is exceeded. Although illustrated as having five sets of current sense circuitry 302A-E and three sets of integrator circuitry 304A-C, it is contemplated that any number of one or more sets of current sense amplifier circuitry 302A-E can be connected in series to any number of one or more sets of integrator circuitry 304A-C.

In some implementations, system 300A can control a plurality of LEDs in an electronic device. In some implementations, the electronic device can be an artificial reality (XR) head-mounted display (HMD) or other XR device in an XR system. When the plurality of LEDs are included in an XR HMD, they can be positioned proximate to one or more eyes and/or a face of a user wearing the XR HMD in order to illuminate and track eye and/or face positions, movements, gestures, etc. In some implementations, the plurality of LEDs can be in two groups configured to illuminate the left and right eye, respectively. In such implementations, it is contemplated that only one set of current sense amplifier circuitry, e.g., current sense amplifier circuitry 302E, is needed per group assigned to a single eye. Further, it is contemplated that each group of LEDs can have its own dedicated set of current sense amplifier circuitry, e.g., current sense amplifier circuitry 302E, and integrator circuitry, e.g., integrator circuitry 304C.

Figure 3B:
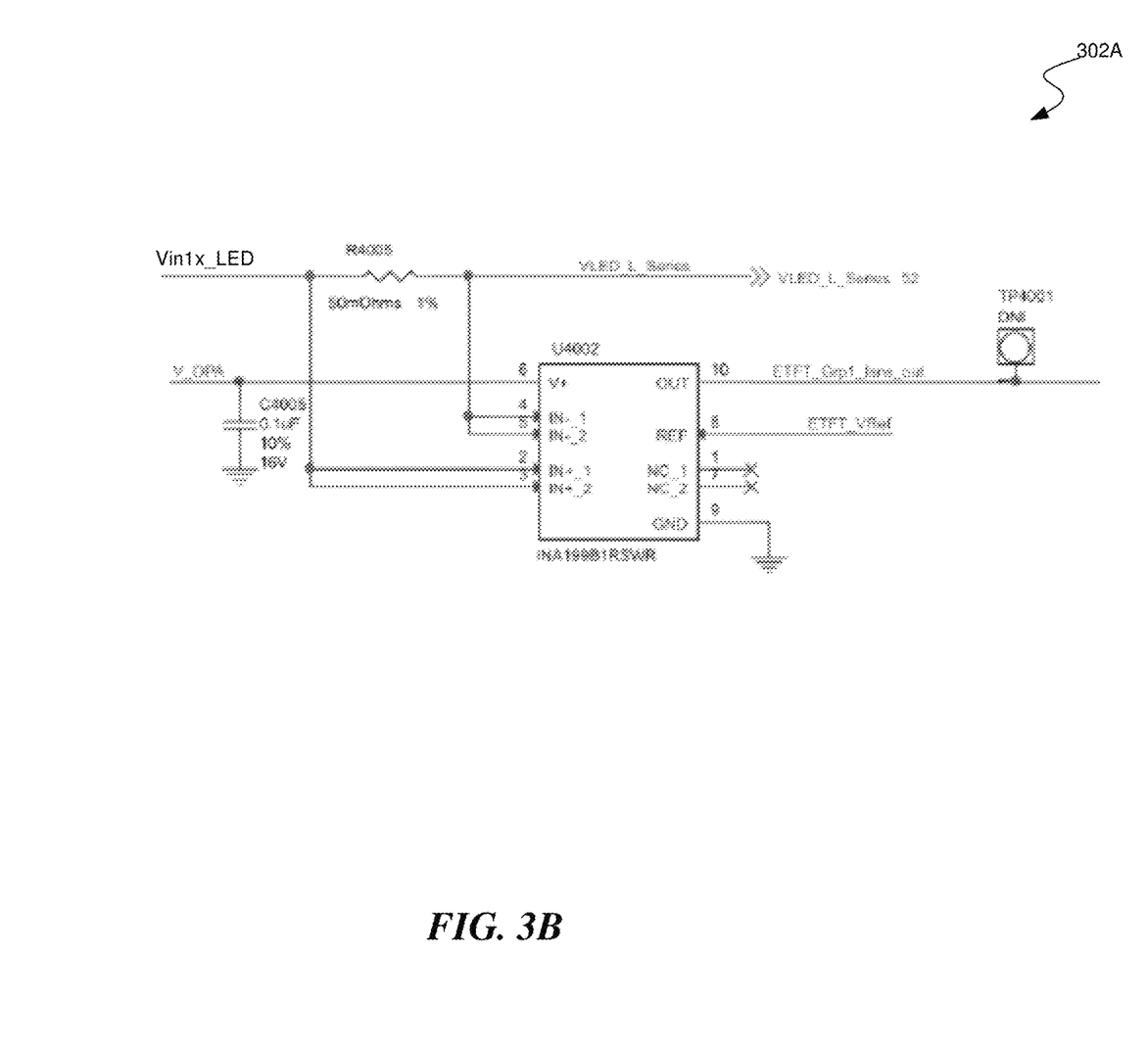
FIG. 3B is a schematic diagram illustrating current sense amplifier circuitry in a system for controlling a plurality of light-emitting diodes (LEDs).

FIG. 3B is a schematic diagram illustrating current sense amplifier circuitry 302A in a system 300A for controlling a plurality of LEDs. Current sense amplifier circuitry 302B-E of FIG. 3A can be similar to current sense amplifier circuitry 302A. Current sense amplifier circuitry 302A can receive voltage to an LED of the plurality of LEDs, Vin1x_LED, which is fed to current sense amplifier U4002. Input pins IN+_1 and IN+_2 can be connected to the supply side of shunt resistor R4005, while input pins IN-_1 and IN-_2 can be connected to the load side of shunt resistor R4005. In some implementations, current sense amplifier U4002 can be connected as close as possible to shunt resistor R4005 in order to minimize resistance in series with shunt resistor R4005. The V+ pin can be connected to supply voltage V_OPA in parallel with bypass capacitor C4005 for stability. The REF pin can be connected to a reference voltage, as described further herein with respect to FIG. 3D. Current sense amplifier circuitry 302A can output sensed and amplified voltage ETFT_Grp1_Isns_out via pin OUT.

Figure 3C:
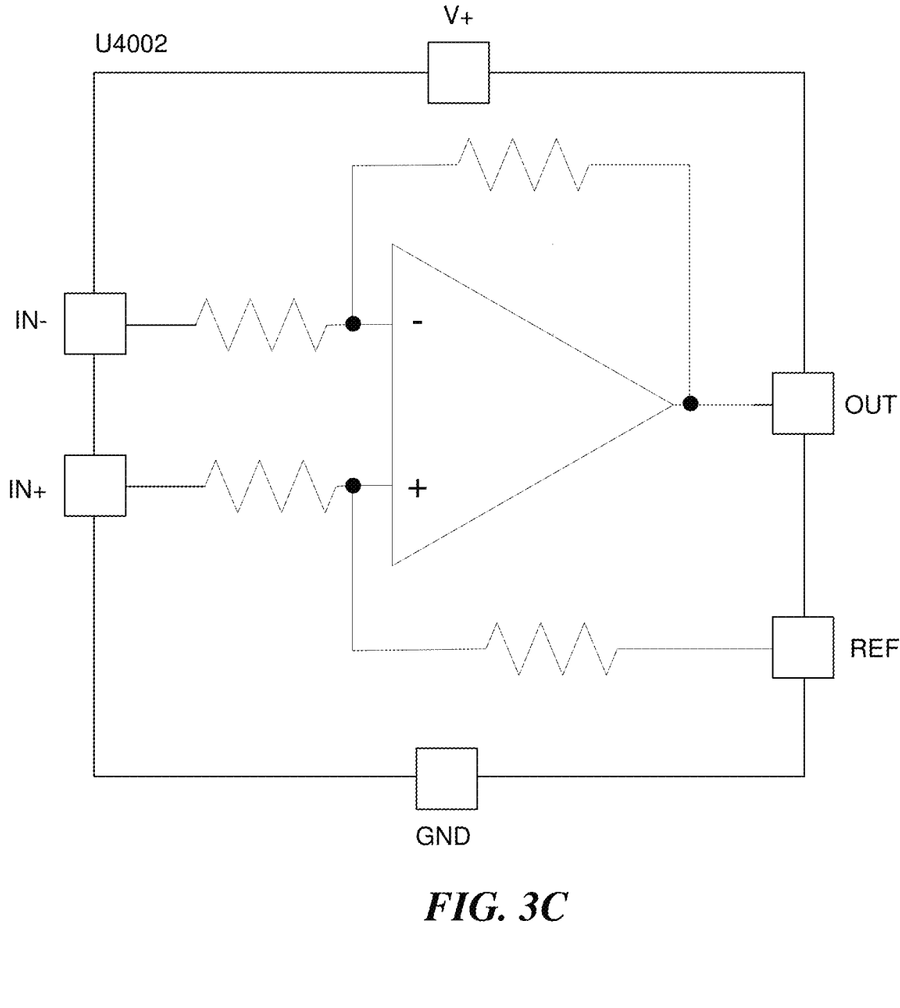
FIG. 3C is a schematic diagram illustrating an exemplary current sense amplifier included in current sense amplifier circuitry in a system for controlling a plurality of light-emitting diodes (LEDs).

FIG. 3C is a schematic diagram illustrating an exemplary current sense amplifier U4002 included in current sense amplifier circuitry 302A-E in a system for controlling a plurality of LEDs. In some implementations, current sense amplifier U4002 can be an INA199B1. In current sense amplifier circuitry 302 A-E, current sense amplifier U4002 can be used in a high-side configuration. Input IN-can correspond to input pins IN-_1 and IN-_2, while input IN+can correspond to input pins IN+_1 and IN+_2. Current sense amplifier U4002 can amplify small differential voltages generated by a current sense resistor, while rejecting the common mode of the rail (i.e., DC supply voltage) itself. In some implementations, to minimize the impact of amplifier offset errors, the current sense resistor should be as large as possible. In one example, the current sense resistor can be 50 mOhm. The input IN+, IN- common mode can range from-0.3 V to 26 V and is independent of the supply voltage V+. The gain can be 50 V/V. The REF pin can be connected to a reference voltage, as described further herein with respect to FIG. 3D. Current sense amplifier U4002 can output sensed and amplified voltage ETFT_Grp1_Isns_out via pin OUT.

Figure 3D:
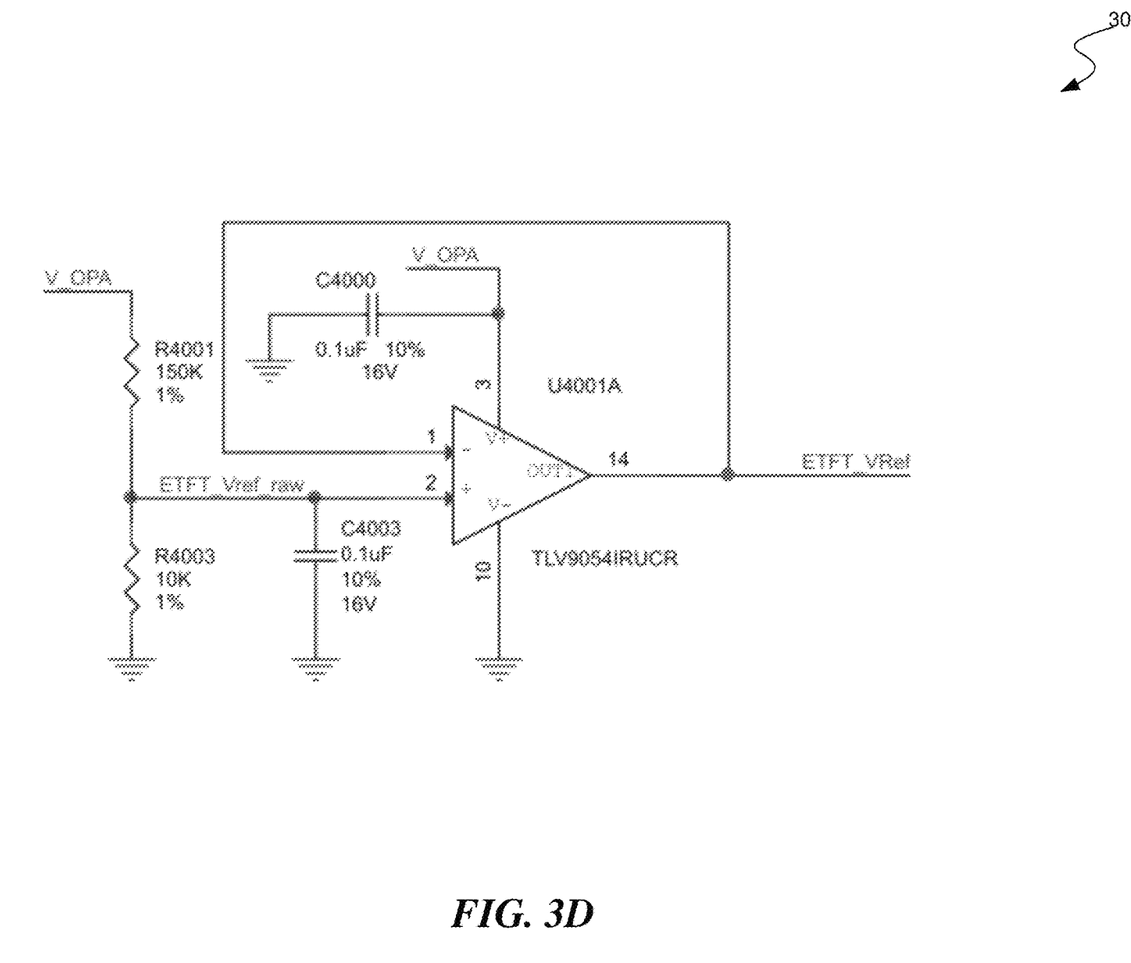
FIG. 3D is a schematic diagram illustrating an exemplary buffered resistor divider included in current sense amplifier circuitry in a system for controlling a plurality of light-emitting diodes (LEDs).

FIG. 3D is a schematic diagram illustrating an exemplary buffered resistor divider 300D included in current sense amplifier circuitry 302A-E in a system 300A for controlling a plurality of LEDs. The output reference voltage ETFT_VRef of buffered resistor divider 300D can be provided to the REF pin of current sense amplifier U4002 of FIG. 3B and FIG. 3C. Buffered resistor divider 300D can allow the output of current sense amplifier U4002 to be biased around the reference voltage ETFT_VRef instead of 0 V. Although current sense amplifier U4002 can slew the output ETFT_Grp1_Isns_out close to the rails (i.e., DC supply voltages), it cannot reach them exactly. By applying an external reference voltage ETFT_VRef, however, the output ETFT_Grp1_Isns_out can be offset to within acceptable limits.

In some implementations, buffered resistor divider 300D can generate the reference voltage ETFT_VRef from the 3.0 V V_OPA rail. In some implementations, the reference voltage ETFT_VRef need only to be slightly above ground, e.g., 10 k/(10 k+150 k)*3.0 V=187.5 mV. In some implementations, buffered resistor divider 300D can be used to provide a low impedance to the REF pin of current sense amplifier U4002. In some implementations, any additional series impedance on the REF pin can add internal resistance and degrade common mode rejection.

Figure 3E:
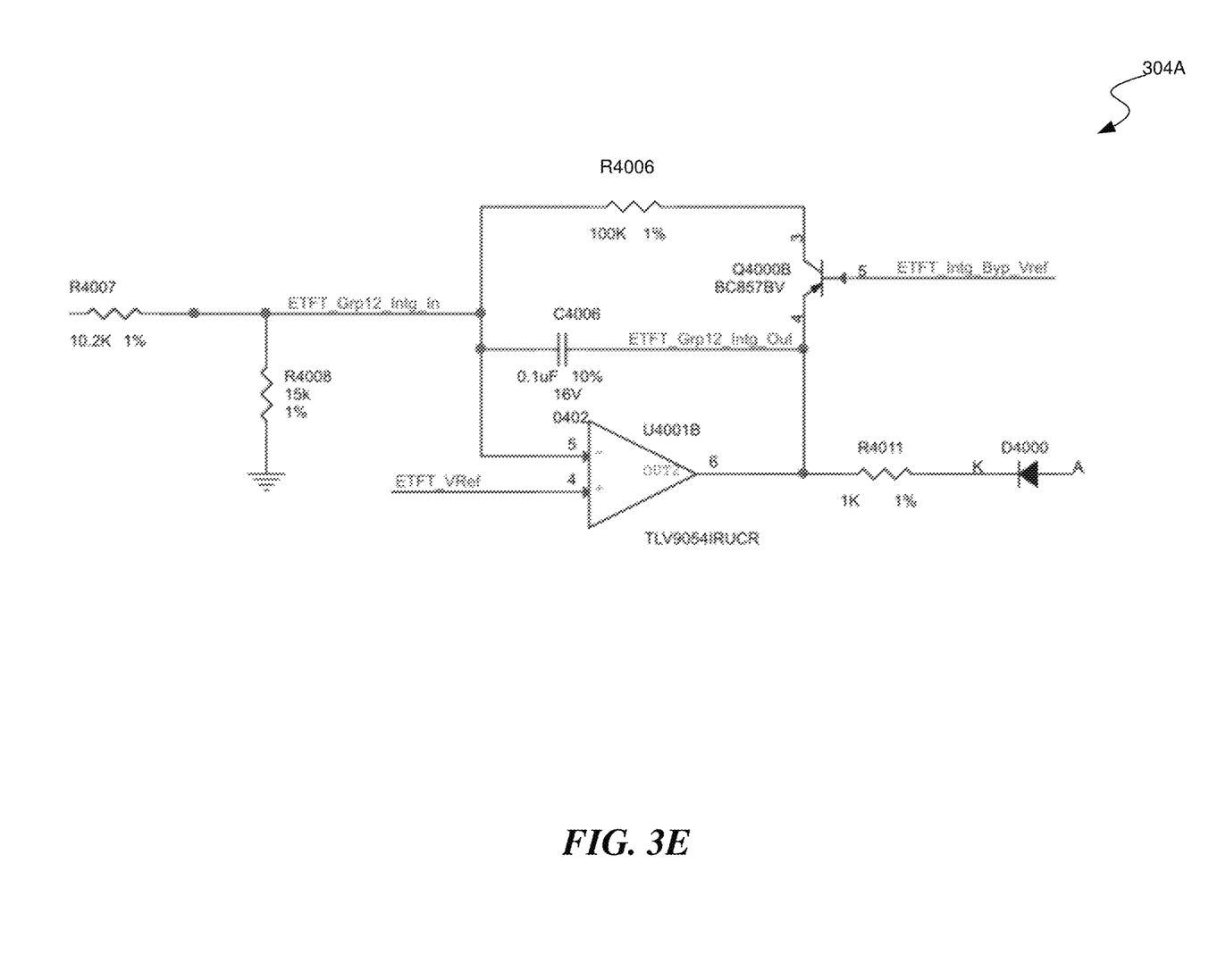
FIG. 3E is a schematic diagram illustrating integrator circuitry in a system for controlling a plurality of light-emitting diodes (LEDs).

FIG. 3E is a schematic diagram illustrating integrator circuitry 304A in a system 300A for controlling a plurality of LEDs. Integrator circuitry 304B-C of FIG. 3A can be similar to integrator circuitry 304A. The output from current sense amplifier U4002 can be connected to resistor R4007. Current can flow through resistor R4007 to capacitor C4006. C4006 can integrate the current based on the following:

$$i(t) = c\frac{dv}{dt}$$

$$\frac{1}{c}\int i(t)dt = v(t)$$

Operational amplifier U4001B can regulate its output OUT2 such that the inverting terminal and the non-inverting terminal are at the same voltage. In some implementations, the inverting terminal can be taken as a fixed value that does not change as long as operational amplifier U4001B is in regulation. If current is flowing into capacitor C4006 from left to right, then voltage across the right side of capacitor C4006 must decrease. If current flows from right to left, then voltage will increase.

The non-inverting terminal of operational amplifier U4001B can be connected to reference voltage ETFT_VRef, i.e., the same reference voltage used by current sense amplifier U4002. Because operational amplifier U4001B in regulation will keep the inverting terminal at the same value, a fixed current will flow through resistor R4008 toward ground, e.g.:

$$I_{leak} = \frac{V_{ref}}{R4008} = \frac{187.5 \text{ mV}}{15 \text{ KOhm}} = 12.5 \text{ μA}$$

Current sense amplifier U4002 can produce a current through R4007 based on the difference between its output and the reference voltage at the inverting terminal. Because current sense amplifier U4002 is biased around the reference voltage, the two reference voltage terms can cancel, e.g.:

$$I_{Sns} = \frac{(V_{Sns} + V_{ref}) - V_{ref}}{R4007} = \frac{V_{Sns}}{R4007}$$

Thus, disregarding the bypass path described further herein, the current flowing into capacitor C4006 must be:

$$v(t) = \frac{1}{c}\int I_{Sns}(t) = I_{leak} dt$$

Figure 4:
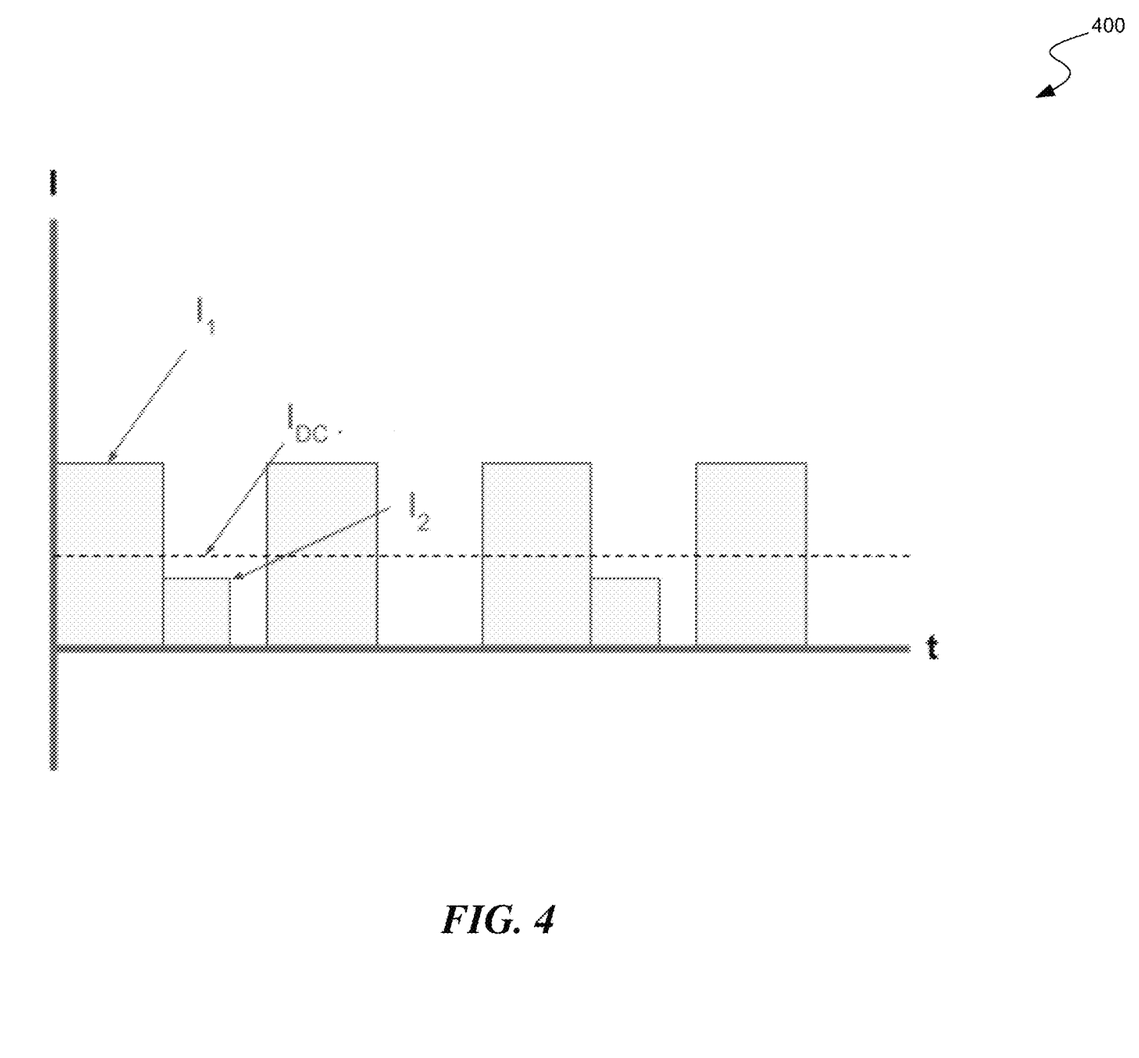
FIG. 4 is a graph illustrating generated current for a plurality of light-emitting diodes (LEDs) as a function of time compared to a threshold current.

The current $I_{leak}$ can define a maximum allowed DC current $I_{DC}$, as described further herein with respect to FIG. 4. When $I_{sns}$ is equal to $I_{leak}$, the integral can remain at a steady state. The maximum allowed DC current $I_{DC}$ can occur when $I_{sns}$ equals $I_{leak}$, which is a function of both R4007 and R4008.

$$I_{Sns} = I_{leak}$$

$$\frac{V_{Sns}}{R4007} = \frac{V_{ref}}{R4008}$$

$$V_{Sns} = \frac{R4007}{R4008}V_{ref}$$

$V_{Sns}$ can be the output from current sense amplifier U4002 without the addition of the reference terminal voltage.

$$V_{Sns} = I_{load} \times R_{Sns} \times A_V$$

$I_{load}$ can be the load flowing through the current sense resistor $R_{sns}$ and $A_v$ can be the voltage gain of current sense amplifier U4002.

If the Isns current is less than the $I_{leak}$ current, the integral will grow negative and operational amplifier U4001B output will increase. At a certain point, the output will reach the positive rail and operational amplifier U4001B will fall out of regulation.

Resistor R4006 and transistor Q4000B can provide a path for current to flow as the output approaches the positive rail. The base of transistor 4000B can be connected to bypass reference voltage generation circuitry 300F of FIG. 3F.

Figure 3F:
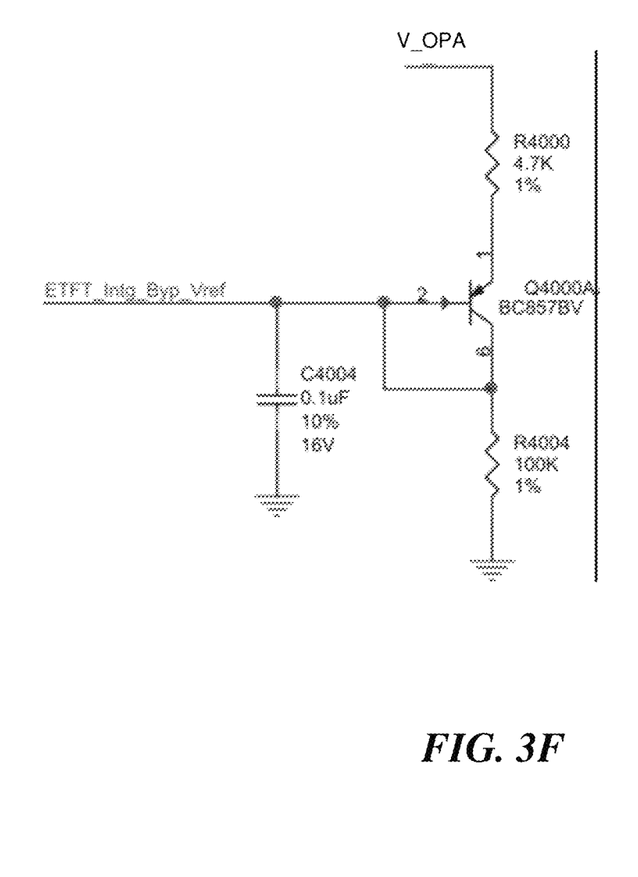
FIG. 3F is a schematic diagram illustrating bypass reference voltage generation circuitry included in integrator circuitry in a system for controlling a plurality of light-emitting diodes (LEDs).

FIG. 3F is a schematic diagram illustrating bypass reference voltage generation circuitry 300F included in integrator circuitry 304A in a system 300A for controlling a plurality of LEDs. Transistor Q4000A can be diode-connected between resistor R4000 can resistor R4004. The bypass voltage $V_{ref}$ can be approximately $V_{BE}$ below the resistor divider created by resistor R4000 and resistor R4004. The bypass voltage $V_{ref}$ can also be complementary to absolute temperature (CTAT) because the $V_{BE}$ of transistor Q4000A will decrease as temperature increases. Transistor Q4000A in integrator circuitry 304A can result in a turn-on voltage that is proportional to absolute temperature (PTAT), i.e., the turn-on voltage at the emitter will increase because $V_{BE}$ becomes smaller. Because both the bypass voltage $V_{ref}$ and transistor Q4000B can have similar characteristics, the temperature effects can largely cancel out in some implementations.

Figure 3G:
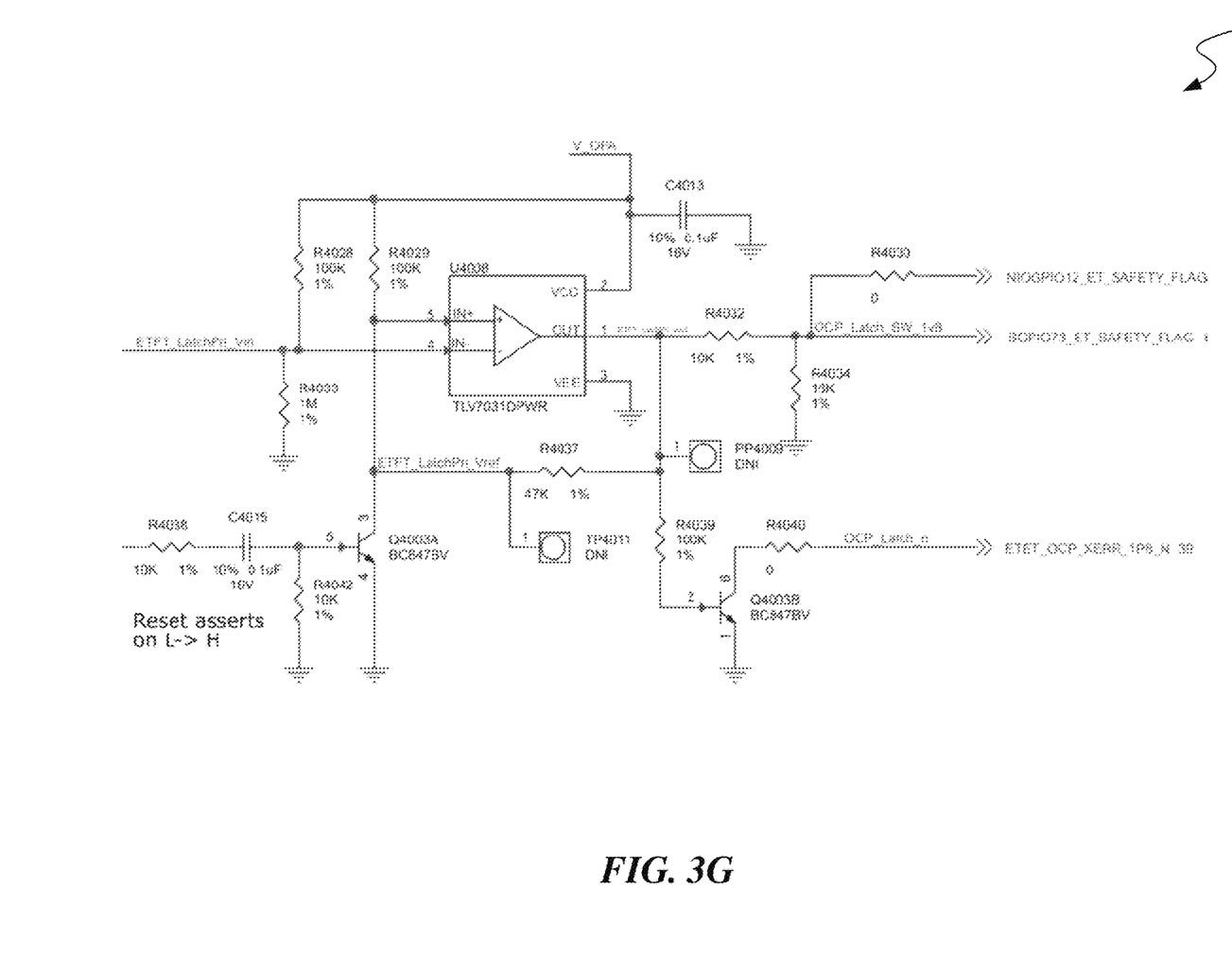
FIG. 3G is a schematic diagram illustrating comparator circuitry in a system for controlling a plurality of light-emitting diodes (LEDs).

FIG. 3G is a schematic diagram illustrating comparator circuitry 306 in a system 300A for controlling a plurality of LEDs. Comparator circuitry 306 can ensure that if any integrator circuitry 304A-C exceeds a fixed threshold, the current flowing to the LEDs is latched until a reset is issued. The outputs of integrator circuitry 304A-C can be combined together with a combiner, e.g., a diode AND, such that the lowest value is input to comparator circuitry 306. For example, the lowest value can be pulled up with resistor R4028 and resistor R4033 to an equivalent 2.73 V.

Comparator circuitry 306 can include positive feedback through R4037 to provide the latching function. When the output is low, the threshold can be set to the resistor divider combination of R4029 and R4027, which can, for example, provide a threshold of 0.96 V. When the inverting input IN− is below the threshold, comparator circuitry 306 can output high. Resistors R4029 and R4037 are in parallel and can pull the non-inverting terminal IN+ to V_OPA (e.g., 3.0 V). In some implementations, because the output of integrator circuitry 304A-C can be pulled to an equivalent 2.73 V through the diode AND, comparator circuitry 306 can remain in the latched condition.

Transistor Q4003A can provide the reset function for comparator circuitry 306. When transistor Q4003A is active, the threshold can be pulled momentarily nearly to ground. The input can be AC coupled through capacitor C4015 to prevent permanently holding comparator circuitry 306 in reset and a rising edge can be required to trigger the reset.

FIG. 4 is a graph 400 illustrating generated current for a plurality of LEDs as a function of time compared to a threshold current $I_{DC}$. The generated current can include two pulse trains $I_1$, $I_2$ with different frequencies and amplitudes. As long as the average generated current is lower than $I_{DC}$, even if a pulse itself exceeds $I_{DC}$, the average optical power of the LEDs would be below a threshold corresponding to the threshold current $I_{DC}$. If, however, the average optical power is slightly above the threshold for a long duration, system 300A can latch the generated current, which can be represented by the following relationship:

$$\int_0^\infty I(t)dt \le \int_0^\infty I_{DC}dt + c$$

"c" can be a constant term that is included to ensure that the initial conditions of the relationship can be satisfied, i.e., the amount that the integral of I(t) can exceed $I_{DC}$ under a short time interval. If the imbalance persists long enough, the integral I(t) will eventually exceed the integral of $I_{DC}$, even with an arbitrary constant. Thus, the above formula becomes:

$$\int_0^\infty I(T) - I_{DC}dt \le c$$

If I(t) is greater than $I_{DC}$, the integral will grow over time, and system 300A will eventually latch the generated current. If I(t) is less than $I_{DC}$, the integral will decrease.

Although some of the electronic components illustrated herein are described with respect to specific values, such values are intended to be exemplary in nature. Thus, it is contemplated that the same or similar effects can be achieved by using other values for the described electronic components. Further, although illustrated as using particular electronic components in particular configurations, it is contemplated that similar or equivalent effects can be achieved with other electronic components, and/or with electronic components in alternative configurations.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative mutually implementations exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

I claim:

1. A system for controlling a plurality of light-emitting diodes (LEDs) in an electronic device, the system comprising:

LED control circuitry coupled to LED driver circuitry, the LED control circuitry comprising:
  a plurality of current sense amplifiers, each current sense amplifier being configured to sense and amplify current received for an LED of the plurality of LEDS;
  a plurality of integrators, each integrator of the plurality of integrators being coupled to an output of a respective current sense amplifier of the plurality of current sense amplifiers, each integrator being configured to integrate the current sensed and amplified by the respective current sense amplifier of the plurality of current sense amplifiers;
  a combiner configured to sum the current integrated by the plurality of integrators; and
  latching comparator circuitry configured to compare the current summed by the combiner to a threshold and latch the current to the plurality of LEDs when the current exceeds the threshold.

2. The system of claim 1, further comprising:
the LED driver circuitry, the LED driver circuitry configured to generate current for the plurality of LEDs and provide the current to the plurality of current sense amplifiers.

3. The system of claim 1, wherein the electronic device is an artificial reality head-mounted display having a rigid body configured to be worn on a face of a user.

4. The system of claim 3, wherein the plurality of LEDs are configured and positioned to illuminate at least one of an eye of the user, the face of the user, or both.

5. The system of claim 1, wherein the threshold is a maximum steady state current associated with producing an irradiance of 100 W/m$^2$ by the plurality of LEDs.

6. The system of claim 1, wherein the latching comparator is configured to latch the current to the plurality of LEDs when the integral exceeds the threshold until a reset is issued.

7. The system of claim 1, wherein each integrator is configured to integrate the current sensed and amplified by the respective current sense amplifier of the plurality of current sense amplifiers minus a fixed direct current (DC) offset.

8. The system of claim 1,
wherein each current sense amplifier receives a reference voltage, and
wherein each current sense amplifier is configured to bias the output around the reference voltage.

9. The system of claim 8, wherein the reference voltage is generated by a buffered resistor divider.

10. A method for controlling a plurality of light-emitting diodes (LEDs) in an electronic device, the method comprising:
receiving, by LED control circuitry, current for the plurality of LEDs;
sensing and amplifying, by a plurality of current sense amplifiers, the current received by the LED control circuitry;
integrating, by a plurality of integrators, the current sensed and amplified by the plurality of current sense amplifiers;
summing, by a combiner, the current integrated by the plurality of integrators;
comparing, by latching comparator circuitry, the current summed by the combiner to a threshold; and
latching, by the latching comparator circuitry, the current to the plurality of LEDs when the current summed by the combiner exceeds the threshold.

11. The method of claim 10, further comprising:
generating, by LED driver circuitry, the current for the plurality of LEDs; and
providing the current to the plurality of current sense amplifiers.

12. The method of claim 10, wherein the electronic device is an artificial reality head-mounted display having a rigid body configured to be worn on a face of a user.

13. The method of claim 12, wherein the plurality of LEDs are configured and positioned to illuminate at least one of an eye of the user, the face of the user, or both.

14. The method of claim 10, wherein the threshold is a maximum steady state current associated with producing an irradiance of 100 W/m$^2$ by the plurality of LEDs.

15. The method of claim 10, wherein the latching comparator circuitry is configured to latch the current to the plurality of LEDs when the current exceeds the threshold until a reset is issued.

16. The method of claim 10, wherein each integrator is configured to integrate the current sensed and amplified by a respective current sense amplifier of the plurality of current sense amplifiers minus a fixed direct current (DC) offset.

17. The method of claim 10,
wherein each current sense amplifier receives a reference voltage, and
wherein each current sense amplifier is configured to bias an output around the reference voltage.

18. The method of claim 17, wherein the reference voltage is generated by a buffered resistor divider.

19. The method of claim 10, wherein the latching comparator circuitry includes A) a comparator and B) multiple resistors, the multiple resistors being included in a positive feedback loop.

20. The method of claim 19, wherein at least two of the multiple resistors are connected in series when the latching comparator has a low output, and wherein the at least two of the multiple resistors are connected in parallel when the latching comparator has a high output.

\* \* \* \* \*